United States Patent [19]

Hell

[11] Patent Number: 4,675,509

[45] Date of Patent: Jun. 23, 1987

[54] HEATING DEVICE FOR APPLIANCES FOR GLUING SHEET-LIKE TEXTILE ARTICLES

[75] Inventor: Günther Hell, Herford, Fed. Rep. of Germany

[73] Assignee: Herbert Kannegiesser GmbH & Co., Fed. Rep. of Germany

[21] Appl. No.: 572,476

[22] Filed: Jan. 20, 1984

[30] Foreign Application Priority Data

Feb. 2, 1983 [DE] Fed. Rep. of Germany ....... 3303452

[51] Int. Cl.⁴ .............................................. H05B 1/02
[52] U.S. Cl. .................................... 219/486; 219/528; 219/351; 219/508; 219/528; 307/38
[58] Field of Search ............... 219/350, 351, 352, 364, 219/483, 486, 508-510, 549, 528; 307/38-41, 117

[56] References Cited

U.S. PATENT DOCUMENTS 3,668,367 6/1972 Williams .............................. 219/486
4,204,111 5/1980 Yonko .................................. 219/350
4,256,127 3/1981 Tsujimoto et al. ................. 219/483
4,333,002 6/1982 Kozak ................................. 219/483

FOREIGN PATENT DOCUMENTS 0421587 11/1934 United Kingdom ................ 219/483
0419892 12/1934 United Kingdom ................ 219/483

Primary Examiner—M. H. Paschall
Attorney, Agent, or Firm—Sughrue, Mion, Zinn, Macpeak, and Seas

[57] ABSTRACT

The heating device for an appliance for gluing sheet-like textile articles has several heating regions (23, 24), the electrical heaters (25) of which can be switched on or off individually. To achieve the best possible setting of the temperature of the heating regions, the individual heaters (25) can, in addition, be changed over to different power inputs, preferably between a series connection and a parallel connection. Also, the individual heaters (25) can each have two or more heating wires which can be changed over between a series connection and a parallel connection in each heater.

16 Claims, 11 Drawing Figures

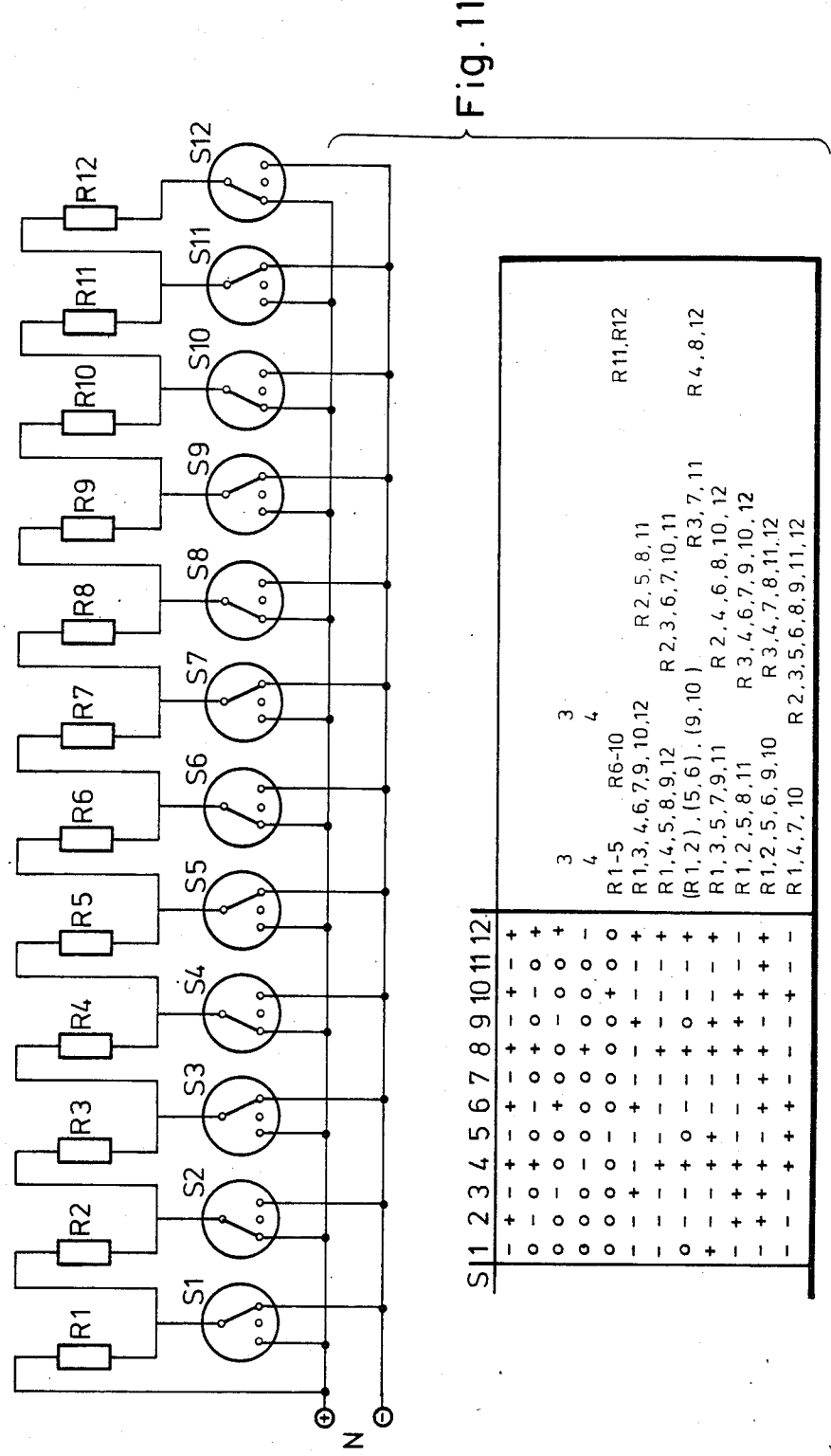

HEATING DEVICE FOR APPLIANCES FOR GLUING SHEET-LIKE TEXTILE ARTICLES

DESCRIPTION

1. Field of the Invention

The invention relates to a heating device for appliances for gluing sheet-like textile articles, with a heating station having several heating regions, the electrical heaters of which can be switched on or off individually, so that specific combinations of heaters are active or inactive.

2. Background of the Invention

A heating device of this type is known, from German Patent Specification No. 2,648,724. In this, the individual heaters can be controlled individually and can be switched on in a specific combination to achieve a predetermined heating-up curve. The basic idea of this known heating device is that the effective length of the heating zone can be varied by cutting in and cutting out predetermined heating regions, and that by means of predetermined switching combinations of heating regions the heating-up process for the textile articles to be glued can be varied within relatively wide limits over the time during which they pass through the heating zone. However, here, the individual heaters can only either be switched on fully or switched off fully.

However, this does not always enable optimum heating of the textile articles to be glued to be achieved. In particular, the temperature cannot be set finely enough. In addition, surge-like loading of the mains occurs in the simple 2-point control used there.

German Offenlegungsschrift No. 2,145,447 makes known a similar heating device in which a plurality of heaters in the form of rollers or box profiles, arranged to be separate from one another in terms of space, are located on both sides of the transport plane for the textile articles to be glued, and here again each heater can be heated individually. Here too, the individual heaters can only be operated on full power.

Finally, German Offenlegungsschrift No. 2,248,181 makes known an appliance for gluing sheet-like textile articles, in which the individual heating zones, each consisting of a plate, are heated by infra-red radiators located behind the rear side of the working surface. Individual adjustment of the temperature in specific regions of the plates is not possible here.

SUMMARY OF THE INVENTION

The object of the invention is to improve the heating device of the type mentioned in the introduction, in such a way that it is possible to achieve heating which is adapted as closely as possible to the particular textile articles to be glued.

This object is achieved, according to the invention, when the heaters can, in addition, be changed over to different power inputs individually or in groups.

This ensures a finer adjustment of the temperature of individual heaters, so that any temperature distributions in time and/or in space can be obtained, without temperature variations caused by transient phenomena having to be tolerated. In particular, on the one hand, very rapid heating can take place and, on the other hand, very precise readjustment of small temperature variations from the desired temperature can be made. Another advantage is that during the readjustment phase, that is to say when there are only small temperature deviations from the desired temperature, no heavy currents have to be connected and no surge-like loading of the energy supply network occurs.

According to one alternative form of the invention, the individual heaters have individually assigned power control devices. These can be thyristors and triac devices, by means of which the electrical power fed to the individual heaters can be varied.

According to another alternative form, the individual heaters can be changed over in groups between a series connection and a parallel connection. If, for example, any two heaters are combined into a group, these heaters can be operated as a group in a series connection or a parallel connection, the power input with a series connection being a quarter of that with the parallel connection.

According to an advantageous embodiment of this idea, the individual heaters each have two or more heating wires which, as heating elements, can be changed over between a series connection and a parallel connection. As a result, each single heater can be adjusted individually in a very simple way, independently of other heaters, in terms of its energy input and consequently its temperature.

According to a further advantageous embodiment of the invention, the individual heaters or the individual heating wires of one or more heaters are connected in groups to a three-phase energy supply. It is then possible, in a particularly advantageous way, to regulate or adjust the energy input, due to the fact that the groups of heaters can be changed over between a star connection and a delta connection. This measure can be provided either on its own or in combination with the change-over possibility between a parallel connection and a series connection. In the latter case, several heaters or heating wires of a heater can be combined into a first group and changed over selectively between a parallel connection and a series connection. Any such group can then also represent a branch which, together with further such branches, can be connected either as a star connection or as a delta connection to the three-phase energy supply. By means of this measure, even finer control can be carried out, since because of the change-over between a star connection and a delta connection the voltage applied to the individual branches can be varied without loss and without expensive voltage dividers.

To control and regulate the entire heating device, there is a control and regulating loop which, together with at least one temperature sensor, changes over the individual heaters to the power input which is best at any particular time, as a result of which a predetermined temperature pattern of the heating regions in terms of time and place can be produced.

The heating mats of claims 3 to 9 provide the possibility of constructing by simple and cheap means individual heaters which can be adapted as closely as possible to the particular intended use or the size of the particular heating regions.

The advantage of the developments of the invention according to claims 15 to 19 is that an effective control or regulation, which can easily be adapted to satisfy the particular conditions required, is possible with technically very simple means.

The invention is explained in more detail below with reference to exemplary embodiments in relation to the drawing in which:

BRIEF DESCRIPTION OF THE DRAWING

FIG. 11 shows a basic circuit diagram of a portion of the heating device with heating wires and associated switches.

List of reference symbols:

| | |
|---|---|
| 15 Spreading station | 56 Line (to 50) |
| 16 Heating station | 57 Line (to 43) |
| 17 Pressing station | 58 Manual input |
| 18 Take-off station | 59 Program input |
| 19 Upper conveyor belt | 60 Thermostat |
| 20 Lower conveyor belt | 61 Potentiometer |
| 21 Roller (of 19) | 62 Program switch |
| 22 Roller (of 20) | 63 Program switch |
| 23 Plate | 64 Program switch |
| 24 Plate | 65 Comparator |
| 25 Heater | 66 Mains switch (for 38) |
| 26 Heating mat | 67 Switch contact |
| 30 Side wall of the appliance frame | 68 Switch contact |
| | 69 Connecting line (Control line) |
| 31 Side wall of the appliance frame | 70 Connecting line (Control line) |
| 32 Plastic material | 71 Control winding (for 72/74) |
| 33 Heating wire | 72 Contactor |
| 34 Layer/lamination (of 26) | 73 Control winding (for 72/74) |
| 35 Layer/lamination (of 26) | 74 Contactor |
| 36 Current feed terminal (of 33) | 75 Switch contact |
| 37 Current feed terminal (of 33) | 76 Switch contact |
| 38 Thermostat | 77 Switch contact |
| 39 Pressure roller (of 17) | 78 Switch contact |
| 40 Pressure roller (of 17) | 79 Energy supply line |
| 41 Roller-supporting lever (of 40) | 80 Energy supply line |
| | 81 Line |
| 42 Fulcrum (of 41) | 82 Line |
| 43 Pressure cylinder (for 40) | 83 Line |
| 45 Table plate (of 15) | 84 Line |
| 46 Table plate, if appropriate cooled (of 18) | 85 Line |
| 47 Arrow | R1–R12 Heating wires |
| 50 Motor | S1–S12 Switches (3-pole) |
| 51 Control and reulating loop | N Energy supply (mains) |
| 52 Line (to 23) | |
| 53 Line (to 24) | |
| 54 Temperature sensor | |
| 55 Line (to 54) | |

DETAIL DESCRIPTION OF THE PREFERRED EMBODIMENT(S)

Figure 1:
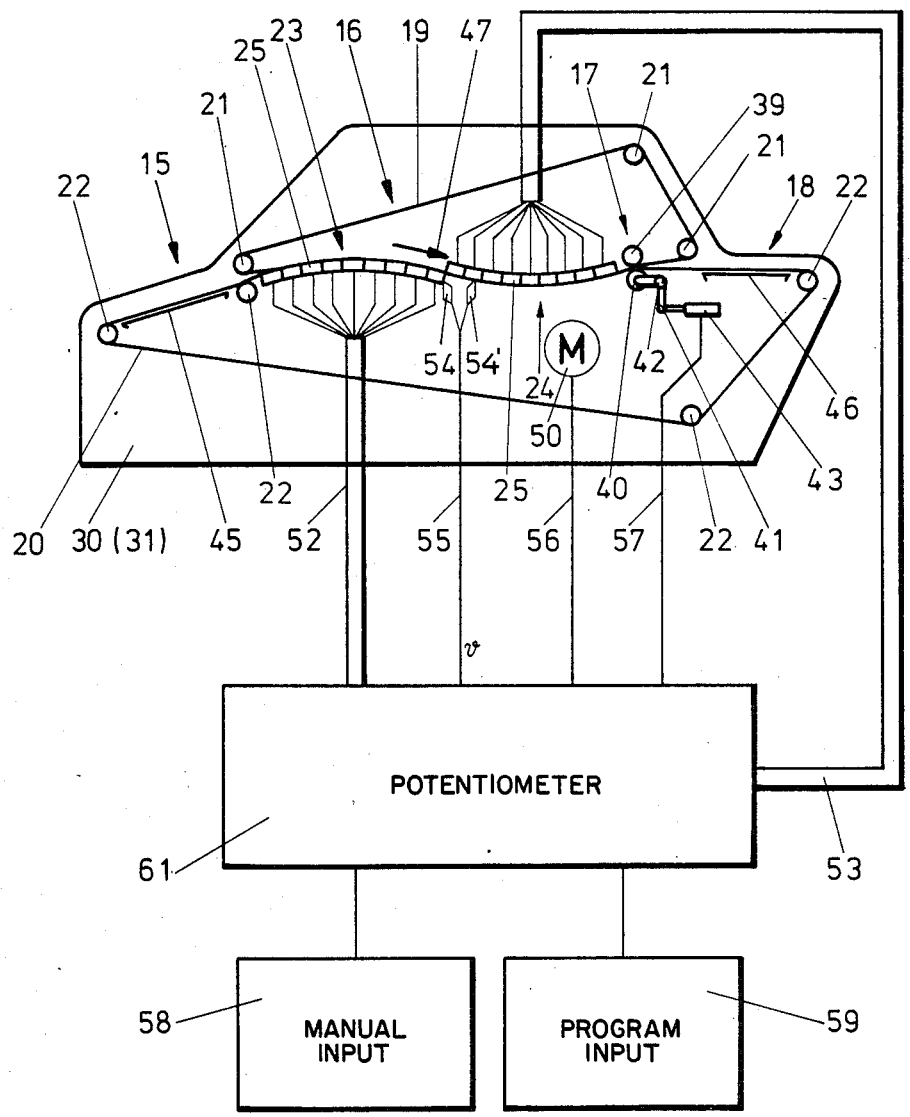
FIG. 1 shows an appliance with a heating device according to the invention.

FIG. 1 shows diagrammatically an appliance with the heating device according to the invention. The basic design of the gluing press, with the exception of the heating device, is known from German Offenlegungsschrift No. 2,248,181. In brief, the textile articles to be glued, intended especially for outer clothing (outer material and lining), pass from a spreading station 15, having a table plate 45, between two continuously revolving feed belts (conveyor belts) 19, 20 via a heating station 16 to a pressing station 17 and from there to a take-off station 18 which has a table plate 46, cooled if appropriate. The two conveyor belts 19 and 20 run parallel to one another within the heating and pressing stations 16 and 17 and enclose between them the textile articles to be glued. The conveyor belts 19, 20 are guided via rollers 21 and 22 which are driven by a motor 50. The heating station 16 contains, here, two heating zones in the form of plates 23 and 24, one of which serves for lower heating and the other for upper heating. The plates 23, 24 are slightly curved here, so that the transport plane is curved approximately sinusoidally in the direction of transport, as a result of which a certain pressing force is generated in the heating station 16. The plates 23 and 24 have individual heaters 25, the temperature of which can be set individually. After passing through the heating station 16, the textile material, which is still located between the conveyor belts 19, 20, passes between two pressure rollers 39 and 40 of the pressing station 17. The pressure roller 40 is articulated via a roller-supporting lever 41 which is pivotable about a fulcrum 42 and which is pressed against the other pressure roller via a pressure cylinder 43. The direction of transport is designated by the arrow 47. The units and individual components described up to now are held in an appliance frame, the side walls of which are designated diagrammatically by 30 and 31.

A control and regulating loop 51 monitors the entire appliance. For this purpose, the individual heaters 25 are connected to the control and regulating loop 51 via electrical lines 52 and 53. Furthermore, the motor 50 and the pressure cylinder 43 are connected to the control and regulating loop 51 via lines 56 and 57 respectively. Finally, each of the plates 23, 24 has at least one temperature sensor 54, 54', respectively which is likewise connected to the control and regulating loop 51 via a line 55.

The control and regulating loop 51 contains a memory and can be controlled by the operator via a manual input 58. In addition, there is a program-input device 59, via which specific parameters for the operating cycle of the appliance and particularly of its heating device can be entered in the control and regulating loop 51. These parameters which can be entered via the program input 59 are in particular:

(a) the desired value of the temperature of the individual heaters (b) the temperature pattern in the heating station (c) the conveying speed (d) the pressing force of the pressing station.

After these parameters have been entered, the corresponding values are stored permanently in the memory of the control and regulating loop 51.

By means of the manual input 58, on the one hand the stored programs can be called up, and on the other hand the appliance can also be operated manually merely by pressing individual keys by hand. The manual input 58 also contains displays for the heating temperature, speed and pressing force. Finally, the manual input 58 can also contain reading devices, for example for bar codes or magnetic tapes, and similar devices for determining the textile material on the point of being treated, etc., whereupon the particular stored program is then called up automatically.

Figure 2:
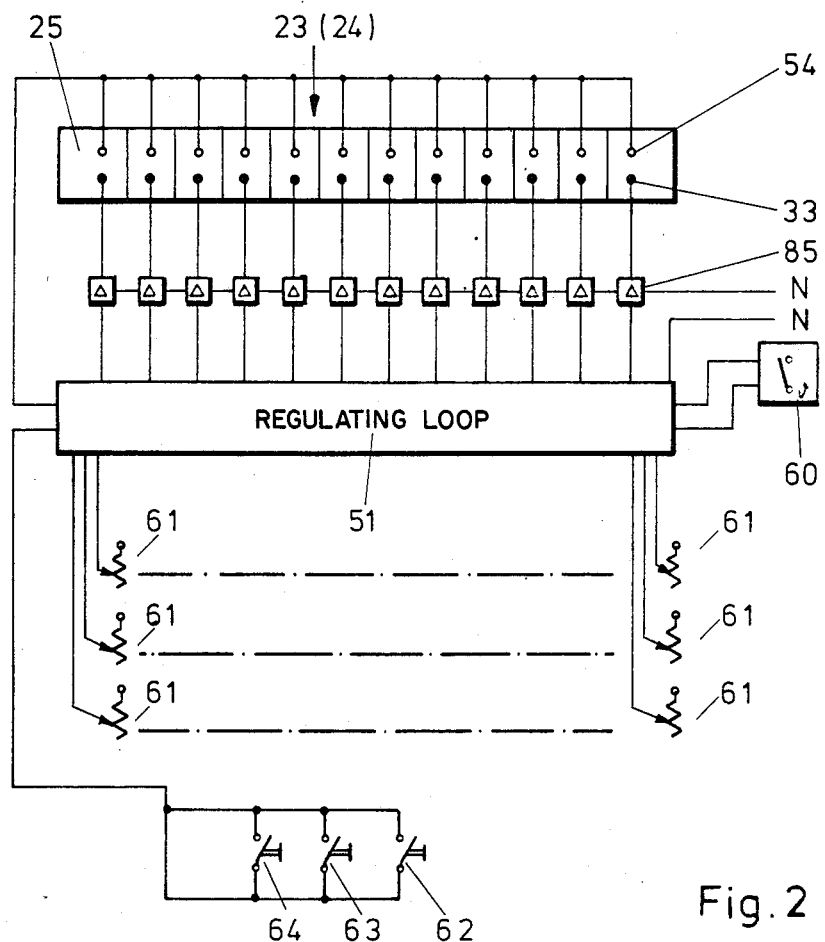
FIG. 2 shows a basic circuit diagram of a first exemplary embodiment of the heating device.

FIG. 2 shows a basic circuit diagram of a cut-out portion of the heating device. Heating wires 33 are embedded in each of the plates 23, 24 formed from various individual heaters 25. Each heating wire 33 is connected to the control and regulating loop 51 via its own power control device 85. Assigned to each heating wire 33 or each power control device 85 is a particular potentiometer 61, via which the desired temperature value for the heating wire 33 concerned can be set. In the exemplary embodiment illustrated, each heating wire 33 has assigned to it its own temperature sensor 54, for example in the form of a thermocouple, the acquired data being fed to the control and regulating loop 51. In a thermostat 60 indicated merely diagrammatically, the temperature values for the individual heating wires 33, measured by the temperature sensors 54, are compared with the desired temperature values set via the potentiometers 61, and then, as a function of this comparison, the individual power control devices 85 are actuated in accordance with the "program" predetermined by the control and regulating loop 51, so that the electrical power required is fed individually via the energy supply N to the individual heating wire 33. Specific pre-entered "programs" can be called up externally via program switches 62, 63 and 64. The control and regulating loop 51 is also connected to the energy supply N for its own supply of energy.

Figure 3:
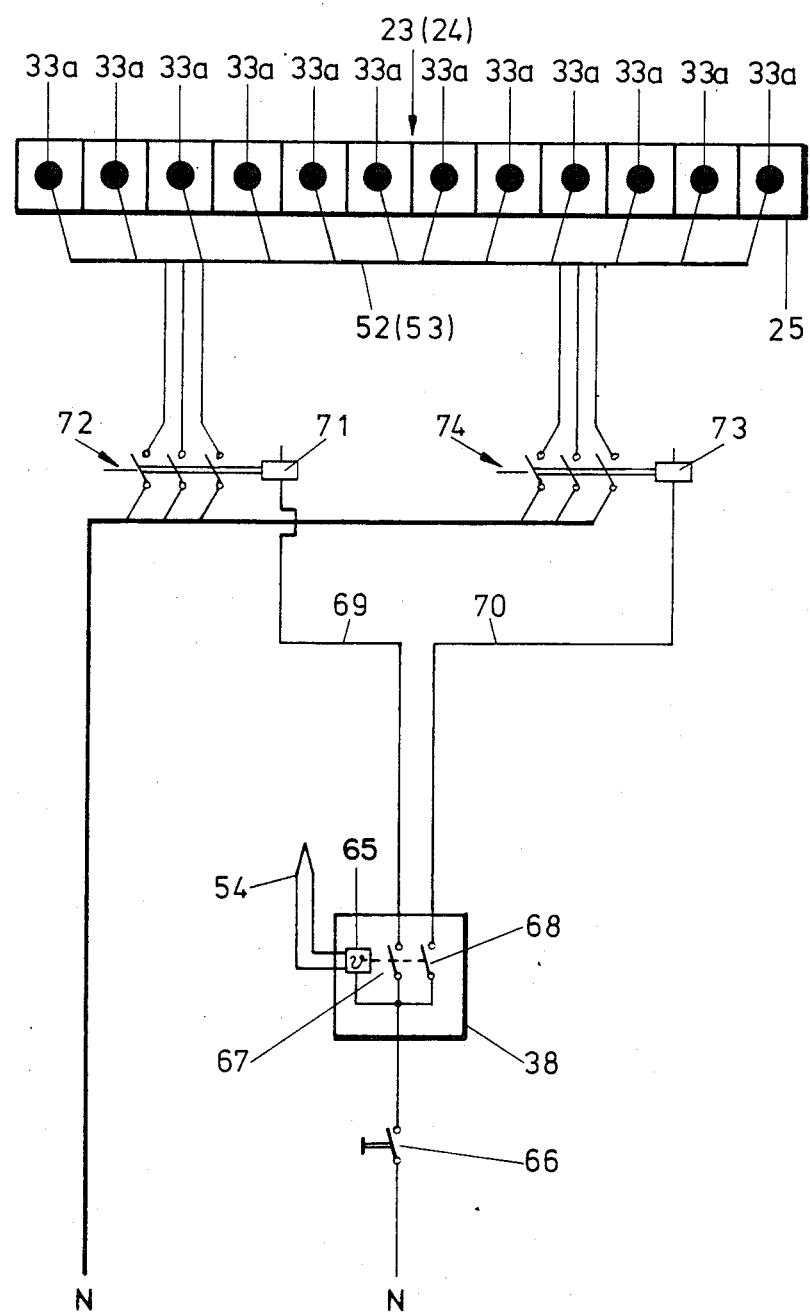
FIG. 3 shows a basic circuit diagram of the heating device in different operating states.
Figure 4:
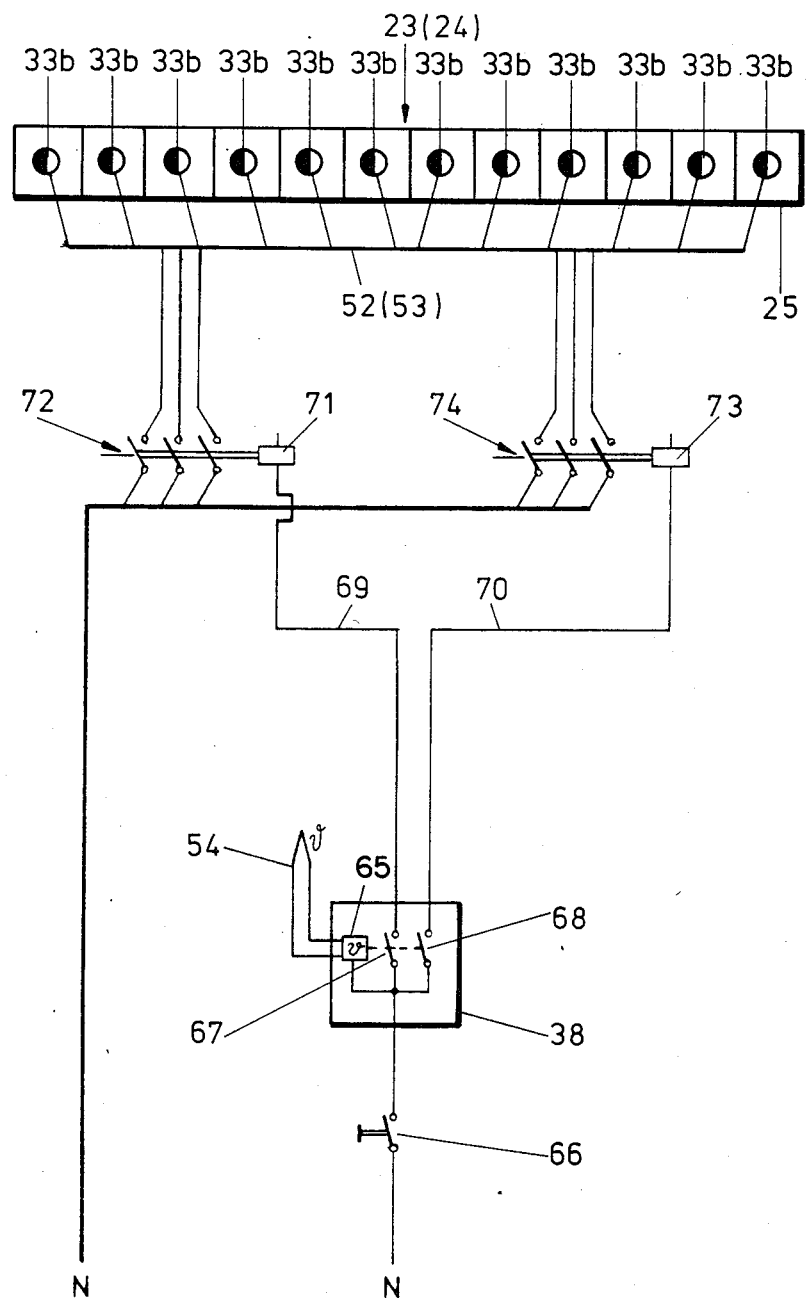
FIG. 4 shows basic circuit diagram of heating wires 33b, FIG. 5 show an alternate circuit diagram of FIGS. 3 and 4.
Figure 5:
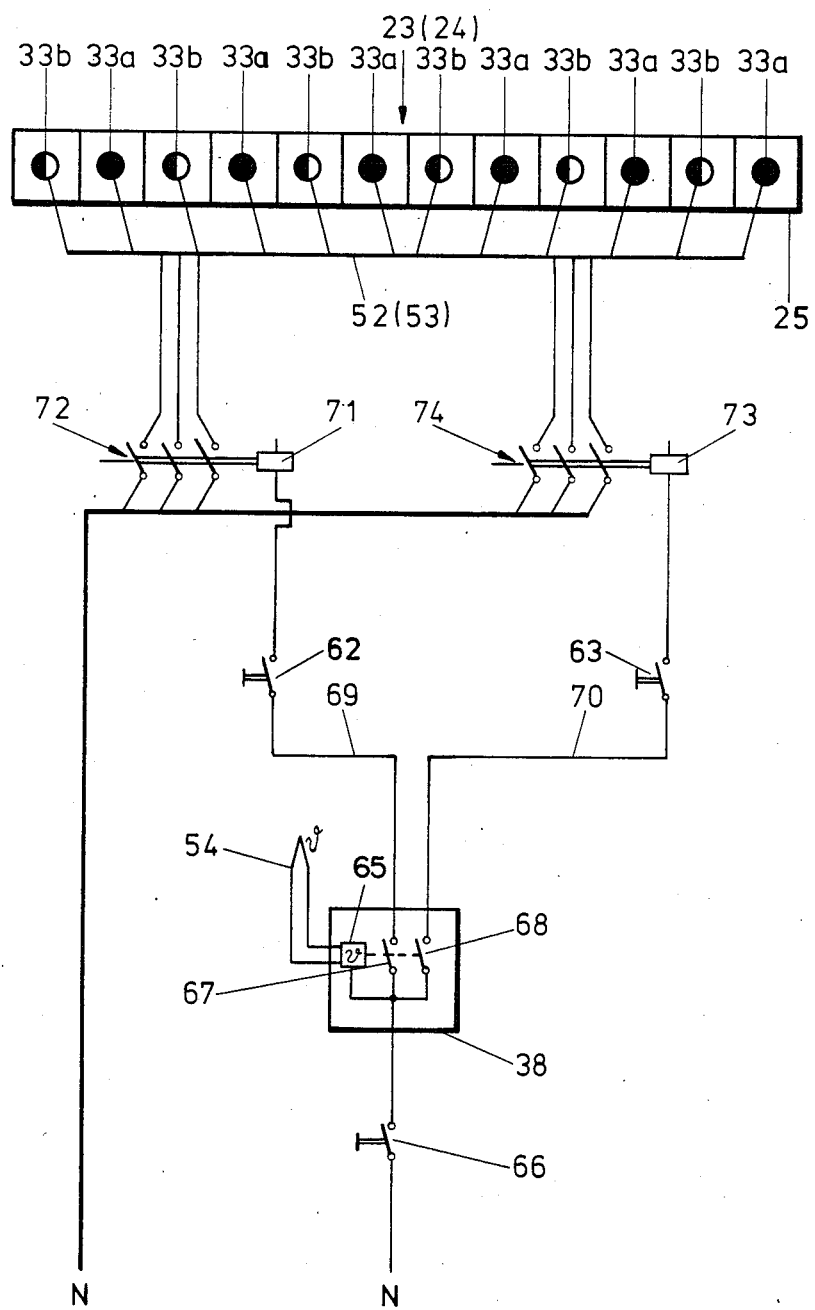

According to the exemplary embodiment of FIGS. 3 to 5, the feed of electrical energy to the individual heating wires 33 is varied by changing over the heating wires 33 between a parallel connection and a series connection. This is indicated diagrammatically in FIGS. 3 to 5 by means of a completely blacked-out circle 33a which represents a heating wire operated with full power, that is to say electrically in a parallel connection, whilst a circle 33b only half blacked-out represents a heating wire operated with reduced electrical power, that is to say in a series connection. In FIG. 3, all the heating wires 33a are operated with full power, as is necessary for the heating-up phase, that is to say rapid heating-up. On the other hand, in FIG. 4, all the heating wires 33b are operated with reduced power, whilst in FIG. 5 one heating wire is operated with reduced power and the following heating wire with full power, alternately.

It should also be pointed out that in the diagrammatic representations of FIGS. 3 and 4, the heating wires designated by 33a and 33b can each consist in themselves of two or more individual heating wires which can then be operated in a series connection or parallel connection. This is explained in more detail with reference to FIGS. 9 and 10. On the other hand, in the exemplary embodiment of FIGS. 3 and 4, the heating wires represented by 33a and 33b can also each contain only a single heating wire, in each case two or more heating wires, which do not necessarily have to be adjacent to one another in terms of space, being combined into a group in such a way that the heating wires of a group are connected to one another in parallel or in series. The individual heating wires 33 (a or b) embedded in a heating mat 26 are connected to the energy supply N via distribution lines, designated here diagrammatically by 52, 53, by way of contactors 72 and 74 respectively. The switching combinations shown here are produced according to the position of the two contactors 72 and 74.

When both contactors 72, 74 are cut in, all the heating wires 33 receive the full main voltage in a parallel connection (FIG. 3). In contrast to this, when the contactor 72 is cut in, whilst the contactor 74 is cut out, all the heating wires 33 are in a series connection (FIG. 4).

FIG. 5 illustrates an alternative form to the circuit designs according to FIGS. 3 and 4. Some of the heating wires are connected in series (heating wires 33b) and some are connected in parallel (heating wires 33a). The heating wires 33a/33b are connected essentially in the way shown in FIG. 10.

These possible positions are set via a thermostat 38. The thermostat 38 contains a comparator 65 with an actuator $\theta$ which actuates two switch contacts 67 and 68. These switch contacts 67, 68 are connected, on the one hand, to the energy supply via a mains switch 66 and, on the other hand, to the respective control windings 71 and 73 of the contactors 72 and 74. If appropriate, program switches 62 and 63 can also be inserted respectively in the connecting lines 69 and 70 between the switch contacts 67, 68 and the control windings 71, 73.

The comparator compares the actual temperature measured by the temperature sensor 54 with the preset desired temperature and sets the two switches 67 and 68 as a function of this comparison such that the desired combination is obtained. More details of this are explained with reference to FIG. 10.

Figure 6:
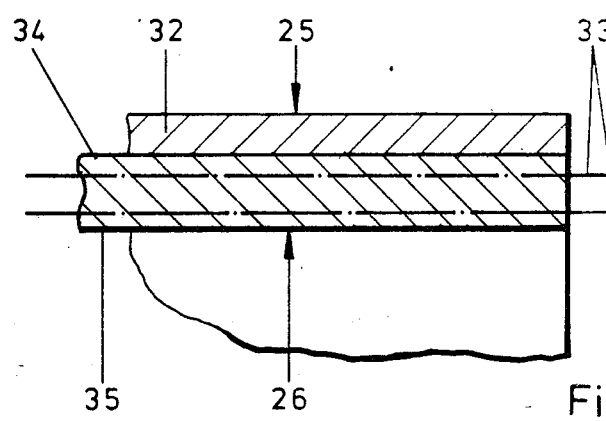
FIG. 6 shows a partial sectional view of a heater as seen in the direction of transport, FIG. 7 show diagrammatic plan views of heating mats for the heaters with different configurations

FIG. 6 shows diagrammatically the mechanical construction of a heater 25 with an associated heating mat 26. Here, the heater 25 consists of a hollow box profile, a heating mat 26 being attached to its side facing away from the working surface. This heating mat 26 consists, here, of two layers 34 and 35 which rest on top of one another and in which the heating wires 33 are embedded. The layers 34 and 35 consist of a flexible plastic material 32, preferably a silicone-rubber vulcanized material (silicone elastomers) which has very good resistance to weathering and aging and high temperature resistance (maximum continuous operating temperature approximately 200° C.).

A glass-fiber fabric is used here as a fabric reinforcement. The heating wires 33 can be intrinsically smooth and also intrinsically spiral. They can be embedded in the plastic material 32 in the form of a U, in the form of a Z, helically, in the form of a meander and/or spirally. They are preferably laid in such a way that their current feed terminals 36, 37 are located on a side of the heating mat 26 extending parallel to the direction of transport, specifically so that they project only on one side. If the heating mat 26 consists of two or more layers, the heating wires 33 of the individual layers can be located above one another in arrangements having different configurations.

Figure 7:
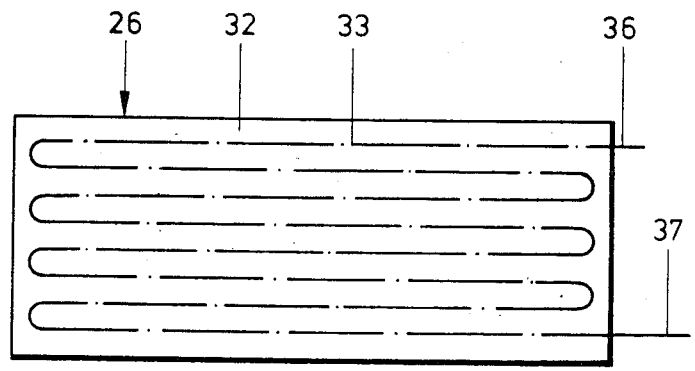
Figure 8:
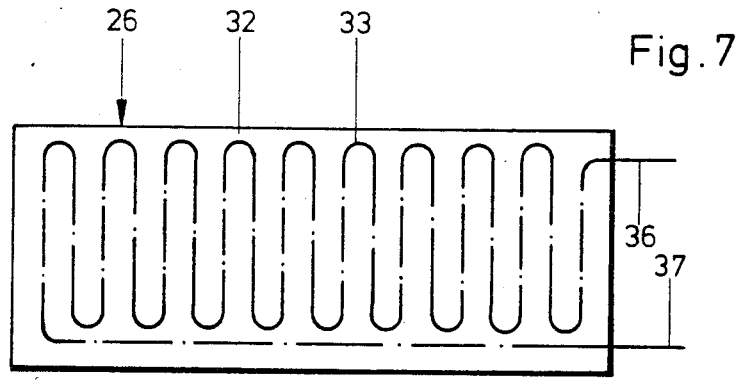
FIG. 8 shows the layout of healthy wires in meander pattern, FIG. 9 for the arrangement of heating wires.
Figure 9:
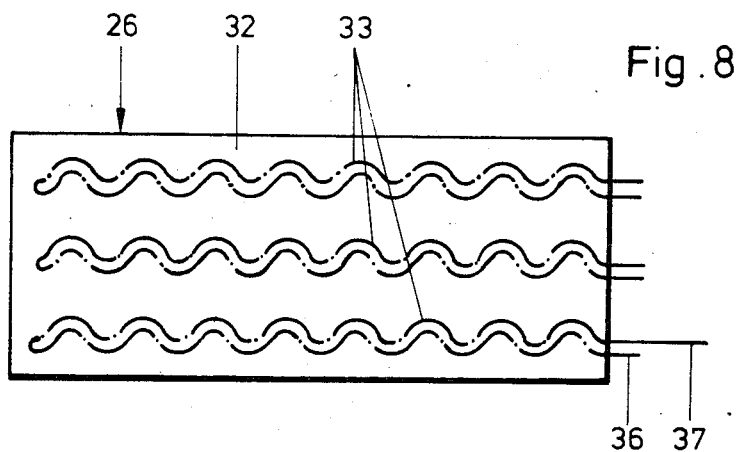

FIGS. 7 to 9 show different configurations in the arrangement of the heating wires 33. In FIG. 7, they are embedded in the plastic material 32 of the heating mat 26 in the form of a meander, the main direction of the heating wire 33 extending parallel to the longer side of the heating mat 26, which means here transversely to the direction of transport. The two current feed terminals 36 and 37 project from one shorter side of the heating mat 26.

In FIG. 8, the heating wires 33 is likewise laid in the form of a meander, but with the main direction parallel to the short side of the heating mat 26. To ensure that, even here, the two current feed terminals 36 and 37 project on one and the same short side of the heating mat 26, the end of the meander-shaped heating wires 33 is guided back again over the full length of the heating mat 26, where it then merges into the current feed terminal 37.

In FIG. 9, three heating wires 33 are laid parallel to one another and to the long side of the heating mat 26 in a U shaped configuration with a serpentine undulation. Here too, all the current feed terminals end on the same side.

Figure 10:
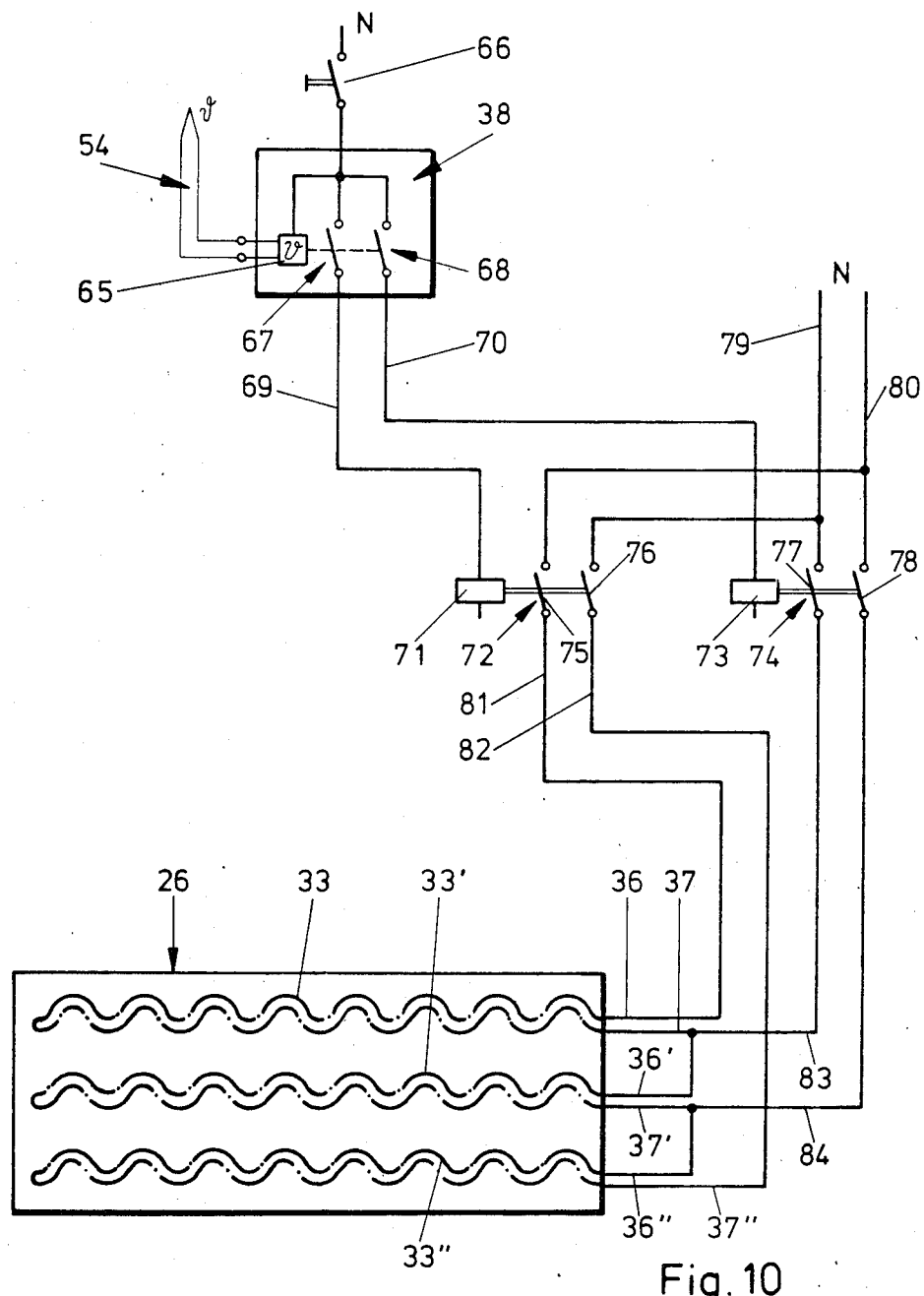
FIG. 10 shows a heating mat according to FIG. 9 together with a basic circuit diagram similar to FIGS. 3 to 5, where three heating wires can be connected either in series or in parallel.

FIG. 10 shows a circuit diagram similar to the exemplary embodiment of FIGS. 3 and 4 in relation to a heating mat 26 according to FIG. 9. If 36, 36' and 36" denote the respective "inputs" of the associated heating wires 33, 33' and 33" and if 37, 37' and 37" denote their respective "outputs", the following circuit arrangement is obtained: the input 36 to the heating wire 33 is connected to one line 80 of the energy supply via a line 81 and a switch contact 75 of the contactor 72. The output 37" of the heating wire 33" is connected to the other line 79 of the energy supply via a line 82 and a switch contact 76 of the contactor 72. Furthermore, the output 37 of the heating wire 33 is connected constantly to the input 36' of the heating wire 33, and the output 37' of the heating wire 33' is connected constantly to the input 36" of the heating wire 33". The three heating wires 33, 33', 33" are thus connected electrically to one another in a series connection, and when the contactor 72 is closed this series connection is linked to the energy supply. Each of the three heating wires receives a third of the main voltage, assuming that their resistance values are the same.

In addition, the common junction points between the output 37 of the heating wire 33 and the input 36' of the heating wire 33' and between the output 37' of the heating wire 33' and the input 36" of the heating wire 33" are connected respectively to the lines 79 and 80 via lines 83 and 84 and switch contacts 77 and 78 of the contactor 74.

When both contactors 72 and 74 are closed, the heating wires are connected to the mains voltage as follows: One pole (line 79) of the mains voltage is applied via the switch contact 76 to the output 37" of the heating wire 33" and via the switch contact 77 to the output 37 of the heating wire 33 and to the input 36' of the heating wire 33'. The other pole (line 80) of the mains voltage is applied via the switch contact 75 to the input 36 of the heating wire 33 and via the switch contact 78 to the output 37' of the heating wire 33' and to the input 36" of the heating wire 33". All three heating wires 33, 33' and 33" are then connected to the full main voltage, that is to say they are connected electrically in parallel with one another. In a third switching position (not shown), in which the contactor 72 is open and the contactor 74 is closed, only the middle heating wire 33' is connected to the main voltage. When both contactors 72, 74 are open, all three heating wires are isolated from the mains voltage.

In this circuit configuration, the heating mat 26 forming a heater 25 here can be operated in three energy stages, namely:
1. full power for all three heating wires;
2. only the middle heating wire 33' at full power; the other two heating wires are disconnected, thus corresponding to a third of the power in comparison with 1;
3. all three heating wires in a series connection, thus corresponding to a ninth of the full power in comparison with the power according to 1.

The contactors 72, 74 are actuated via the thermostat 38 which has the same design as that described with reference to FIGS. 3 and 4. When the main switch 66 is switched on, the thermostat 38 is supplied with energy. The temperature sensor 54 measures the temperature of the heating mat 26, and the comparator 65 compares this measured temperature with a preset desired temperature. If there is a large deviation between the desired value and actual value, the two switch contacts 67 and 68 are closed, whereupon the contactors 72 and 74 close their associated switch contacts. The heating mat 26 is switched to full power. When heating-up has ended, and this can be, for example, 30° C. below the desired set operating temperature, the switch contact 68 is opened, whilst the switch contact 67 remains closed. As a result, the contactor 74 drops, whilst the contactor 72 remains closed. The heating is thus changed over from a parallel connection to a series connection. Conversely, in the third switching position, (not shown), already mentioned above, it is also possible for the switch contact 67 to open at a specific temperature below the desired temperature and for the switch contact 68 to remain closed. In this case, heating-up is continued with only one heating wire, but this is at full power. When the predetermined operating temperature is reached at the measuring point of the temperature sensor 54, the two switch contacts 67 and 68 are opened, whereupon the two contactors 72 and 74 drop and isolate the heating wires from the energy supply. The operating temperature is regulated and subsequently readjusted automatically by means of the thermostat 38 with a tolerance of at most ±3%, preferably a tolerance of 1%.

A further alternative form of the heating device is shown by reference to FIG. 11. In this, several heating wires R1–R12 are connected permanently to one another in a series connection. The common junction points of two electrically adjacent heating wires are each connected to a switch contact of an associated 3-pole switch S1–S12. One pole (in FIG. 11 the left-hand pole) of each of the switches S1–S12 is connected to one pole of the energy supply N. One pole of each electrical switch is "neutral", that is to say electrically potential-free. The third pole of each of the switches S1–S12 is connected to the other pole of the energy supply N.

The table in FIG. 11 shows various possible switch combinations. A "+" means that the associated switch contact is in the left-hand position, whilst a "−" means that the switch contact is in the right-hand position in FIG. 11. A "0" denotes the neutral position.

In the exemplary embodiment illustrated, the "input" of the first heating wire R1 is connected directly to a pole of the energy supply, without a switch being interposed, whilst the "output" of the last heating wire R12 is connected to the energy supply via a switch S12 similar to the remaining switches. The first heating wire R1, could, of course, also be connected to the energy supply via an appropriate switch. The basic principle of the switch positions is as follows:

When the switches at the two terminals of a heating element are in the same position, the same potential is applied to both terminals of the heating element, so that this heating element is inactive. When the corresponding switches at the "input" and "output" of a heating wire are in two opposite positions (that is to say, not in the neutral position), the full mains voltage is applied to the particular heating wire (parallel connection). When a switch is in the neutral position, the two heating wires located electrically in front of and behind it are connected in series. If, for example, the switches S1–S11 of FIG. 11 are in the neutral position and the switch S12 is in the right-hand switch position, then all the heating wires R1–R12 are in series with one another. Further switch combinations can be taken from the Table in FIG. 11.

The switches S1–S12 are actuated via the control and regulating loop 51. Actuation can take place electrically here, for example via magnet coils, or even mechanically via a roller control mechanism. It is evident that by means of the relatively simple configuration of FIG. 11 it is possible to set a plurality of "energy stages" which can cover all the cases arising in practise.

All the technical details represented in the patent claims, the description and the drawing can be essential to the invention either by themselves or in any combination with one another.

I claim:

1. A heating system for apparatus for gluing sheet-like textile articles comprising:
   a heating station (16) for receiving and heating said sheet-like textile articles, said heating station being comprised of a plurality of individua heaters (25) arranged next to one another in the transport direction of said sheet-like textile articles, each of said heaters (25) including, bonded to the rear side of the heater working surface, at least one heating wire (33), said heating wires being connected to a power supply through a control and regulating means for selectively controlling the electrical power to each of the heating wires of each heater; wherein said control and regulating means includes switch means for selectively connecting the heating wires of said heaters to said power supply in groups, said control and regulating means further including a plurality of power controllers, one connected to each heating wire or group of heating wires, for selectively connecting its respective heating wire or group of heating wires to the power supply through the switch means; and further comprising:
   at least one temperature sensor (54) operable with said control and regulating means to control the connections of the individual heaters (25) to said power supply through said switch means, so that a predetermined temperature pattern of the heating regions in terms of time and place is obtained.

2. A heating device as claimed in claim 1, wherein the individual heaters (25) or individual heating wires (33) of one or more heaters (25) are connected in groups to a three-phase power supply, and further including means for switching the connection of said groups of heaters or groups of heating wires between a star connection and a delta connection.

3. A heating device as claimed in claim 1, wherein the flexible heating mat (26) consists of a fabric-reinforced plastic material (32) in which the heating wires (33) are embedded.

4. A heating device as claimed in claim 3, wherein the flexible heating mat (26) is made multi-layer, each layer (34, 35) has one or more heating wires (33), and the individual layers (34, 35) are vulcanized or glued to one another.

5. A heating device as claimed in claim 3, wherein the plastic material (32) is a silicon-rubber vulcanized material with a continuous operating temperature of approximately 200° C.

6. A heating device as claimed in claim 3, wherein the fabric reinforcement is a glass-fiber fabric.

7. A heating device as claimed in claim 3, wherein the heating wires are one of either smooth and spiral.

8. A heating device as claimed in claim 7, wherein the heating wires (33) are embedded in the plastic material (32) and are layed out therein in the form of a U, or in the form of a Z, helically and/or spirally, and their current feed terminals (36, 37) are arranged on a side of the heating mat (26) which extends parallel to the direction of transport.

9. A heating device as claimed in claim 8, wherein two or more layers of heating wires (33) arranged in different configurations are embedded above one another in the plastic material (32) of at least one layer (34, 35) of the heating mat (26).

10. A heating device as claimed in either one of claims 1 or 2 or 3 through 9, wherein said control and regulating means includes means for causing the heating wires (33) to be first connected in parallel and then in series, until the predetermined operating temperature on the working surface of the heaters (25) is reached.

11. A heating device as claimed in either one of claims 1 or 2 or 3 through 4, wherein the current feed terminals (36, 37, 36', 37', 36'', 37'') of the heating wires (33, 33', 33'') of a group are constantly connected to one another in such a way that the heating wires are connected electrically to one another in a series connection, wherein the current feed terminals (36, 37'') forming the input and output of this group are connectable to the energy supply (N) via a contactor (72), wherein the common junction points of the heating wires (33, 33' or 33', 33'') are connectable to the energy supply (N) via a further contactor (74), the switch contacts (75, 76, or 77, 78) of the contactors (72, 74) being connected in such a way that when all of these contacts are cut in each heating wire (33, 33', 33'') is connected per se to the full power supply voltage, and wherein the control windings (71, 73) of the contactors (72, 74) are each connectable to the energy supply (N) via a switch contact (67, 68), and the switch contacts (67, 68) can be actuated selectively via a thermostat (38) in interaction with a temperature sensor (54).

12. A heating device as claimed in either one of claims 1 or 3 through 9, wherein all the heating wires (R1–R12) of a group are connected electrically in series, wherein the common junction points of electrically adjacent heating wires and of at least one of the end terminals of this series connection can be connected selectively via three-pole switches (S1–S12) to one of the poles of the power supply (N) or to a neutral (potential-free) terminal, and wherein the individual switches (S1–S12) can be switched independently of the others into one of the three positions.

13. A heating device as claimed in either one of claims 1 or 2 or 3 through 9, wherein the individual heaters (25) or their heating wires (33) can be controlled via said control and regulating means (51) containing a mechanical or electrical memory, and further including at least one of a manual input (58) and a program input (59) for controlling said control and regulating means.

14. A heating device as claimed in claim 13, wherein the control and regulating means (51) includes means for controlling at least the set temperature of the heaters (25), and the temperature pattern of the heating zones.

15. A heating device as claimed in claim 1, wherein said switch means selectively connect the heating wires (33) or said groups of heating wires in series or in parallel, or some heating wires or groups of heating wires in parallel and some in series.

16. A heating device as claimed in either one of claims 1 or 15, wherein each of said heaters (25) includes a flexible heating mat (26) bonded to the rear side of the heater working surface, at least one of said heating wires being embedded in each of said heating mats.

* * * * *